US008095318B2

United States Patent
Heliot et al.

(10) Patent No.: US 8,095,318 B2
(45) Date of Patent: Jan. 10, 2012

(54) METHOD FOR ESTIMATING FORMATION DIP USING COMBINED MULTIAXIAL INDUCTION AND FORMATION IMAGE MEASUREMENTS

(75) Inventors: Denis Heliot, Sugar Land, TX (US); Selim Djandji, Sugar Land, TX (US); Pascal Mantran, Plaisir (FR)

(73) Assignee: Schlumberger Technology Corporation, Sugar Land, TX (US)

( * ) Notice: Subject to any disclaimer, the term of this patent is extended or adjusted under 35 U.S.C. 154(b) by 389 days.

(21) Appl. No.: 12/340,167

(22) Filed: Dec. 19, 2008

(65) Prior Publication Data

US 2010/0161228 A1    Jun. 24, 2010

(51) Int. Cl.
| | |
|---|---|
| G01V 1/40 | (2006.01) |
| G01V 5/04 | (2006.01) |
| G01V 9/00 | (2006.01) |
| G01V 1/00 | (2006.01) |
| G01V 3/08 | (2006.01) |
| E21B 47/00 | (2006.01) |

(52) U.S. Cl. ........... 702/10; 702/6; 702/11; 166/250.01; 367/25; 324/329

(58) Field of Classification Search ............. 702/2, 6–11, 702/57; 340/853.1, 854.1, 856.3, 870.05–870.07, 340/870.11; 166/250.01, 250.02, 250.16; 324/323, 326, 329, 333, 339, 346–348, 358; 367/25, 33, 81, 82, 117, 153

See application file for complete search history.

(56) References Cited

U.S. PATENT DOCUMENTS

| | | | |
|---|---|---|---|
| 4,567,759 A | | 2/1986 | Ekstrom et al. |
| 6,092,024 A | | 7/2000 | Wu et al. |
| 6,727,706 B2 * | | 4/2004 | Gao et al. ....................... 324/339 |
| 6,819,111 B2 * | | 11/2004 | Fanini et al. ................... 324/339 |
| 6,885,947 B2 * | | 4/2005 | Xiao et al. ...................... 702/17 |
| 7,536,261 B2 | | 5/2009 | Omeragic et al. |
| 2004/0100263 A1 | | 5/2004 | Fanini et al. |
| 2005/0083063 A1 | | 4/2005 | Omeragic et al. |
| 2007/0267192 A1 | | 11/2007 | Wang et al. |
| 2008/0215244 A1 | | 9/2008 | Yang et al. |

* cited by examiner

Primary Examiner — Mohamed Charioui
Assistant Examiner — Ricky Ngon
(74) Attorney, Agent, or Firm — Darla P. Fonseca; Jody Lynn DeStefanis; Charlotte Rutherford

(57) ABSTRACT

A method for determining dip of rock formations penetrated by a wellbore using multiaxial induction measurements and imaging measurements made from within the wellbore includes estimating dip from the multiaxial induction measurements. Dip is also estimated from the imaging measurements. The dip is determined by combining the induction and imaging measurements.

9 Claims, 3 Drawing Sheets

US 8,095,318 B2

METHOD FOR ESTIMATING FORMATION DIP USING COMBINED MULTIAXIAL INDUCTION AND FORMATION IMAGE MEASUREMENTS

CROSS-REFERENCE TO RELATED APPLICATIONS

Not applicable.

STATEMENT REGARDING FEDERALLY SPONSORED RESEARCH OR DEVELOPMENT

Not applicable.

BACKGROUND OF THE INVENTION

1. Field of the Invention

The invention relates generally to the field of determining orientation and electrical resistivity of subsurface rock formations using measurements made from within a wellbore. More particularly, the invention relates to methods for determining such attitude and resistivity using combinations of multiaxial induction measurements and wellbore image measurements.

2. Background Art

Important parameters for evaluating the structure and the circumstances of geologic creation of subsurface rock formations include the geodetic attitude or "dip" of the rock formations. Dip is usually defined as the geodetic orientation of a rock formation along the direction corresponding to layers of the rock formation. Other important parameters include electrical resistivity of the rock formations, which is related to fractional volume of pore space in the rock formations and the fluid content in the pore spaces of such rock formations. In some cases, rock formations consist of relatively thin (with respect to the axial resolution of certain measuring instruments) layers of rock having alternating high and low electrical resistivity. Determining electrical resistivity of the more resistive layers in such formations has proven useful in their identification and their characterization as containing useful materials such as oil and natural gas.

Methods are known in the art for evaluating dip of rock formations using measurements made from within a wellbore drilled through the rock formations. One such method includes making electromagnetic induction measurements of the rock formations along mutually orthogonal electromagnetic field directions from within a wellbore. An instrument for performing such measurements and for evaluating dip and electrical resistivity of the formations from such measurements is used to provide services under the service mark RT SCANNER, which is a service mark of an affiliate of the assignee of the present invention. Dip and resistivity evaluation using the RT SCANNER instrument provides information on a geologic structural scale, that is, on the order of entire layers of rock formation usually 1 meter or more in thickness.

Another technique for evaluating rock formation dip known in the art includes evaluation of resistivity measurements made along the wall of the wellbore using a device having a plurality of galvanic measuring electrodes spaced on "pads" configured to contact the wall of the wellbore. Current flow and/or voltage drop with reference to selected ones of the electrodes is related to electrical resistivity of the rock formations in contact with the pads. Resistivity as determined from current flow and/or voltage drop may be used to calculate a color or gray scale image density value corresponding to each of the electrodes, and such color or gray scale image density values may be presented in a display that corresponds to circumferential position of each of the electrodes on the wellbore wall and the depth of each of the electrodes along the wellbore wall. Such presentation corresponds to a visual "image" of the wellbore wall. One instrument that is used to make such measurements provides services sold under the service mark FMI, which is a service mark of an affiliate of the assignee of the present invention. Dip may be estimated using such images by estimating axial displacement of rock formation layer boundaries from one side of the wellbore to the other, and converting such axial displacement into angular displacement of the rock layers from geodetically horizontal and angular orientation with respect to a geodetic or other reference. Formation layer boundaries may be inferred from the image, either automatically by setting image density thresholds, or by visual inspection of the display. Dip estimation using the FMI service can have resolution to a scale of several millimeters. Limitations to the accuracy of such dip estimation using the FMI service result from the fact that converting the layer position displacement to geodetic angular displacement assumes that the wellbore is round and that the image values correspond to resistivity changes at the wellbore wall surface. As will be appreciated by those skilled in the art, the actual resistivity response of a galvanic electrode device may be laterally displaced from the wellbore wall by an amount related to the electrical resistivity itself, and in many cases, the wellbore is not perfectly round, but may be oval shaped, or rugose, depending on the particular rock formations that were penetrated and fluid used to drill the wellbore, among other factors.

Measurements made by instruments such as the RT SCANNER instrument are typically processed by an inversion technique to provide "vertical" resistivity, "horizontal" resistivity and apparent formation dip. Vertical resistivity is generally defined as electrical resistivity measured in response to electric current flowing in a direction normal to the formation layer boundaries, while horizontal resistivity is generally defined as electrical resistivity measured in response to electric current flowing generally parallel to the layer boundaries. The foregoing multiaxial induction inversion technique assumes a relatively simple geometric model for the rock formations, namely that they are disposed in substantially infinitely extending, parallel layers (the so called "layer cake" model). Such model generally does not take into account effects of lateral variations in the formation resistivity caused by, e.g., wellbore fluid infiltration into porous rock formations ("invasion"), fractures, cross-bedding, lateral variation of rock formation composition and/or grain size distribution ("facies"), formation layer termination by reduction of thickness ("pinch out") laterally away from the wellbore, and rock formation heterogeneities such as inclusions of pebble size grains, precipitated quartz ("chert") and/or other minerals.

Therefore, differences exist between the dip determined using image instrument measurements and the measurements from the RT SCANNER instrument. Such differences can be explained based on the principles of measurement of each instrument, but the explanation will vary depending on the particular rock formation and the wellbore shape. Understanding such differences can results in a more accurate dip determination. Still further, accurate evaluation of formation dip may be used to improve the results of the multiaxial induction inversion procedure by removing dip as an output parameter of the inversion procedure. There continues to be a need for improved rock formation dip determination.

SUMMARY OF THE INVENTION

A method according to one aspect of the invention for determining dip of rock formations penetrated by a wellbore using multiaxial induction measurements and imaging measurements made from within the wellbore includes estimating dip from the multiaxial induction measurements. Dip is also estimated from the imaging measurements. The dip is determined by combining the induction and imaging measurements.

A method according to another aspect of the invention for determining dip, uses vertical resistivity and horizontal resistivity of rock formations penetrated by a wellbore using multiaxial induction measurements of the formations and imaging measurements of the formations. The method includes estimating dip, vertical resistivity and horizontal resistivity from the multiaxial induction measurements. Dip is estimated from the imaging measurements. A weighted average dip is determined from the estimated induction dips and estimated imaging dips. The estimating the vertical resistivity and horizontal resistivity is then repeated using the weighted average dip as an input parameter.

Other aspects and advantages of the invention will be apparent from the following description and the appended claims.

DETAILED DESCRIPTION

Figure 1:
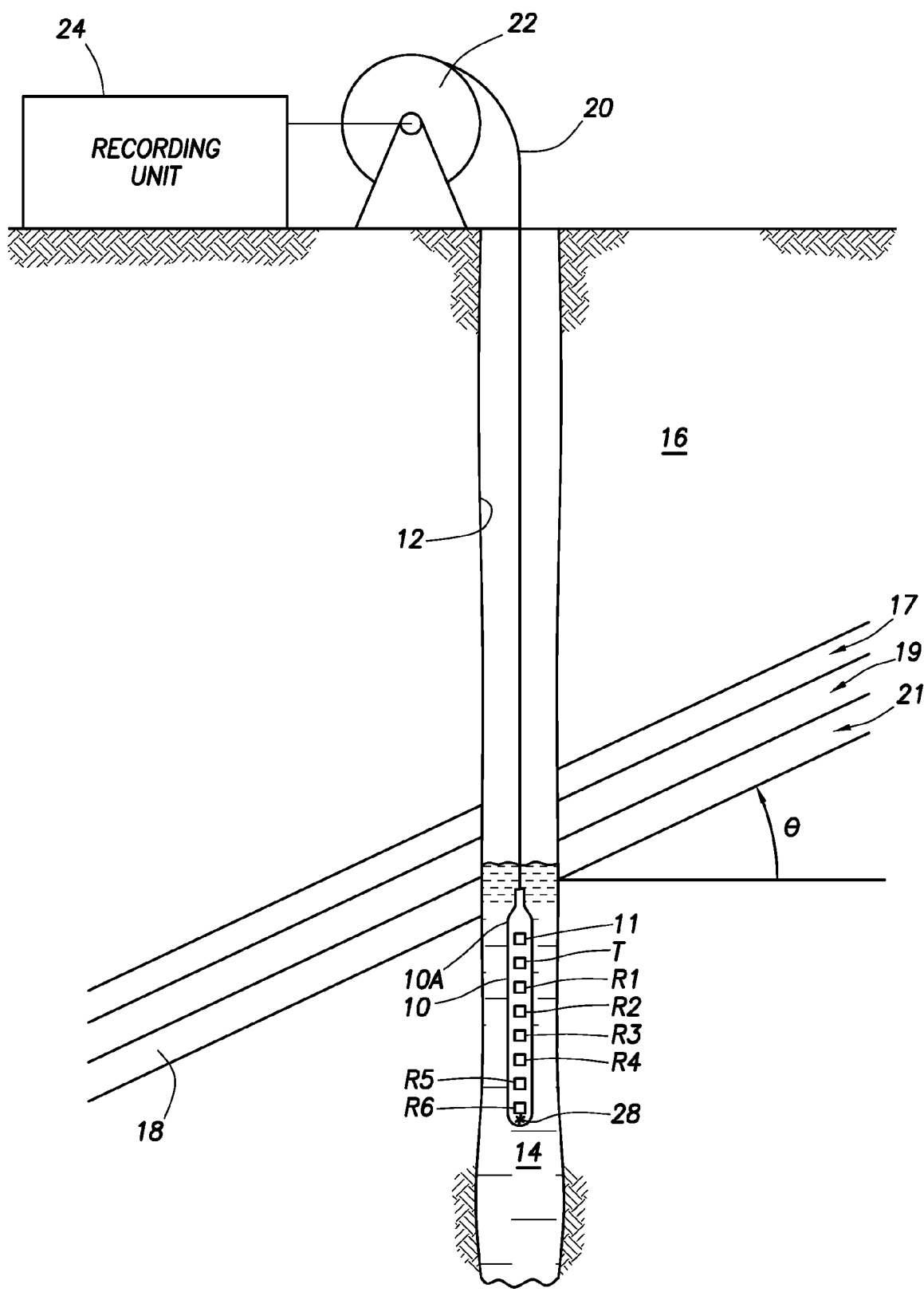
FIG. 1 shows an example of a multiaxial electromagnetic induction well logging instrument disposed in a wellbore drilled through laminated rock formations.

FIG. 1 shows an example of a multiaxial electromagnetic induction well logging instrument ("induction instrument") being used to acquire signals usable to estimate formation dip. The induction instrument 10 may be moved through a wellbore 12 drilled through subsurface rock formations 16, 18 at the end of an armored electrical cable 20. The cable 20 may be extended into the wellbore 12 and withdrawn from the wellbore 12 to move the induction instrument 10 using a winch 22 or similar spooling device known in the art. Power to operate the induction instrument may be provided by a recording unit 24 disposed at the surface and in electrical and/or optical communication with conductors (not shown separately) in the cable 20. Signals from the induction instrument 10 may be communicated to the recording unit 24 along the cable 20.

The induction instrument 10 may include a generally elongated housing 10A configured to move along the wellbore 12. In the present example, the induction instrument 10 may include one or more triaxial induction transmitters, one shown at T, and a plurality of spaced apart triaxial induction receivers R1 through R6 disposed at selected positions from the transmitter T. Details of the transmitter and receivers will be explained further below with reference to FIG. 2. While the present example includes one transmitter and six spaced apart receivers, the number of transmitters and receivers is not a limit on the scope of the present invention. The induction instrument 10 will typically includes circuitry, shown generally at 11, for conducting electrical current through the transmitter T and detecting voltages induced in the receivers R1 through R6. Signals corresponding to the detected voltages may be formatted for transmission to the recording unit 24 for recording and interpretation.

The wellbore 12 may be filled with liquid 14 called "drilling mud" used during the drilling of the wellbore 12. In some examples, the drilling mud 14 may have as its continuous phase an electrically non-conductive material such as oil. Other examples may have water as the continuous phase and are thus electrically conductive. One of the rock formations shown at 18 may consist of a plurality of discrete layers, shown generally at 17, 19 and 21. The layers 17, 19, 21 may have different electrical resistivity from each other, such that apparent electrical resistivity of the formation 18 may be different when measured in a direction parallel to the lateral extent of the layers 17, 19, 21 ("bedding planes") than when measured perpendicular to the bedding planes. As shown in FIG. 1, it is also the case that the bedding planes of the formation 18 will intersect the wellbore 12 other than perpendicularly. The induction instrument shown herein makes measurements that are intended to resolve the electrical resistivity of the formation 18 both along and perpendicular to the bedding planes substantially irrespective of the angle of intersection of and the geodetic direction of the bedding planes.

Although the wellbore 12 is shown in FIG. 1 as being approximately vertical, as is known in the art wellbores are commonly drilled along trajectories that include non-vertical or even horizontal portions. The angle of intersection of the bedding planes of the formation, which may be referred to as "dip", is indicated by θ. The angle of intersection is a result of a combination of the inclination of the wellbore 12 from vertical and the geodetic attitude ("dip") of the formation 18.

Figure 2:
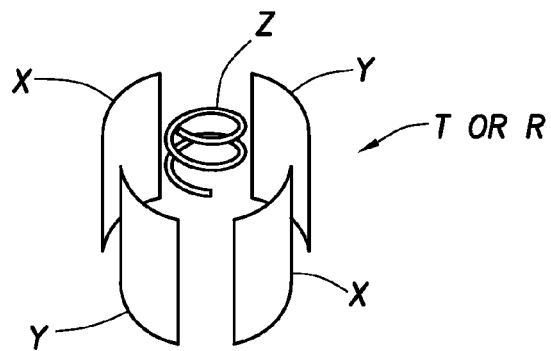
FIG. 2 shows an example of a triaxial induction coil that may be used in various examples of a well logging instrument as in FIG. 1.

FIG. 2 shows an example of a triaxial coil that may be used for one or more of the transmitter (T in FIG. 1) or receivers (R1 through R6 in FIG. 1). The coil may include two "saddle" type coils arranged to conform approximately to the shape of the instrument housing (10A in FIG. 1). The saddle type coils may enclose areas on opposite sides of the housing (10A in FIG. 1) so as to have dipole moment oriented substantially perpendicular to the axis of the instrument (10 in FIG. 1) and substantially perpendicular to each other. Two such enclosed areas are shown respectively at X and Y in FIG. 2. The triaxial coil may also include a solenoid type coil, shown at Z that has dipole moment substantially coaxial with the axis of the instrument. The coil arrangement shown in FIG. 2 provides magnetic dipoles along each of three mutually orthogonal axes having a common midpoint therebetween.

Using measurements made by an instrument such as shown in FIGS. 1 and 2, and as explained with reference thereto, it is possible to obtain estimates of formation resistivity with the equivalent of electric current flowing in a direction normal to the planes of the formation layers, such resistivity referred to as "vertical resistivity" and represented by Rv. It is also possible to obtain estimates of formation resistivity with the equivalent of electric current flowing along the layer planes, such resistivity referred to as "horizontal resistivity" and represented by Rh. It is also possible to obtain estimates of the angle θ using the foregoing measurements. One non-limiting example of estimating such values, including the angle θ is described in U.S. Patent Application Publication No. 2006/0253255 filed by Omeragic et al., the patent application for which is assigned to the assignee of the present invention. It will be appreciated by those skilled in the art that the estimates of the angle θ made from the foregoing electromagnetic induction measurements are referenced to the induction instrument geometry. Typically, the circuits (11 in FIG. 1) will include devices (not shown separately in the figures) for measuring geodetic orientation of the induction instrument, so that measurements made by the induction instrument can be oriented geodetically. Thus the angle θ can be referenced to geodetic markers such as gravitational vertical, and magnetic or geodetic North. As explained in the Background section herein, estimates of formation dip made using an instrument such as shown in FIG. 1 may be limited to "structural scale", for example, on the order of 1 meter or more in resolution. Also as explained in the Background section herein, using the instrument shown in FIGS. 1 and 2 to resolve resistivities Rh and Rv, and to estimate dip, assumes essentially no lateral variation in the formation resistivities.

It should also be clearly understood that the present example of a multiaxial induction instrument, in which the transmitter and receivers include three mutually orthogonal wire coils (and have three corresponding mutually orthogonal dipole moments, is only one example of multiaxial induction instrument that can be used to make measurements usable with methods according to the invention. In other examples induction measurements may be made along other than orthogonal directions. It is only necessary for purposes of the invention to acquire electromagnetic induction signals having dipole moment orientations sufficient to estimate dip and Rv/Rh values. Accordingly, the term multiaxial as used herein is intended to include any combination of dipole moment orientations sufficient to perform such estimation.

Formation dip may be estimated to a smaller scale, on the order of millimeters, using a wellbore "imaging" instrument. One non-limiting example of a wellbore imaging instrument is shown in U.S. Pat. No. 4,567,759 issued to Ekstrom et al. and assigned to the assignee of the present invention. In principle, wellbore imaging instruments measure a property of rock formations along or immediately adjacent to the wall of the wellbore, and present the measurements in a gray scale or color scale presentation corresponding to a visual image of the wellbore wall. While the example shown in the foregoing patent provides resistivity data usable in generating wellbore images, the present invention is not limited in scope to such instrument, or to the use of resistivity-type imaging instruments. Other imaging instruments, such as acoustic instruments, or density instruments may be used in other examples consistently with the scope of the present invention.

The wellbore imaging instrument may form part of the induction instrument shown at 10 in FIG. 1, for example, or it may be a separate instrument. The wellbore imaging instrument may be moved through the wellbore concurrently with the induction instrument of FIG. 1, or may be moved separately. The imaging instrument may include a pad 28 on which an array 30 of galvanic electrodes 32 is placed in a manner as more particularly described in the aforementioned patent issued to Ekstrom et al. and which description is incorporated herein by reference. The array 30 may be formed of rows 34 of electrodes 32 which are laterally so displaced that as instrument is moved during an investigation, the array 30 of electrodes 32 investigates overlapping locations of the earth formation. In such manner a segment of the borehole wall 12A is investigated with high resolution, on the order of millimeters.

The electrodes 32 may be in the shape of circular buttons and the rows 34, although close to each other, are spaced by selected distances, shown at D. The electrodes 32 may have a diameter of about five millimeters and the separation D between the rows 34 may be of a comparable dimension, typically about one centimeter. When electrical current measured on the buttons 32 is sampled for the entire array 30 and the samples subsequently depth shifted to a common depth interval, the number of formation locations investigated in the circumferential direction is equal to the number of electrodes in the array 30. The survey currents are sampled at a sufficiently high frequency to obtain an investigation of a substantially continuous segment of the earth formation. As more fully explained in the Ekstrom et al. patent, images produced using current measurements made from the electrodes 32 may be used to estimate rock formation dip on a scale of millimeters.

Figure 3:
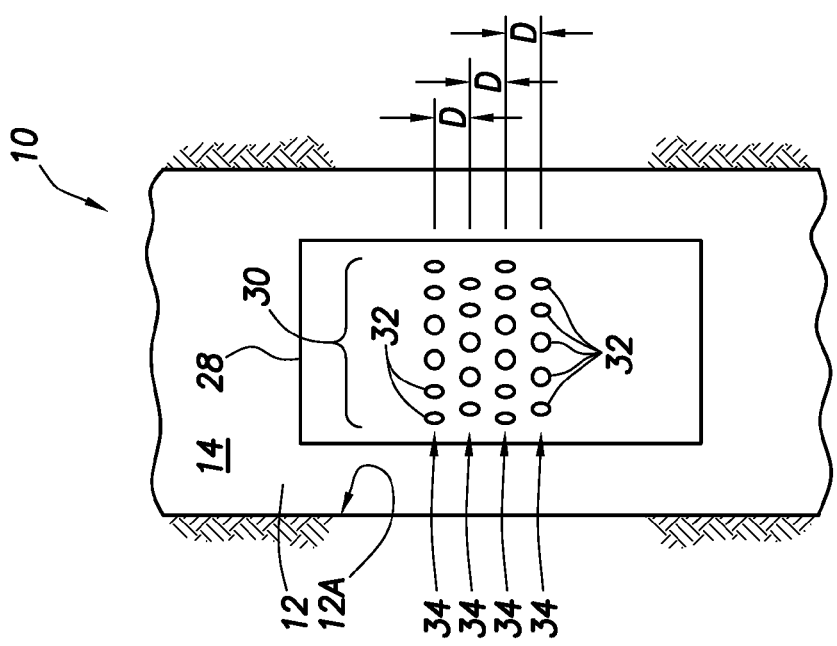
FIG. 3 shows a resistivity imaging device that may be used for measuring resistivity of rock formations proximate a wall of the wellbore, which instrument may be combined with or operated separately from the instrument of FIG. 1.

The foregoing example instruments explained with respect to FIGS. 1 through 3 are so called "wireline" instruments because they may be conveyed through the wellbore by using an armored electrical cable (e.g., 20 in FIG. 1) deployed by a winch e.g., (20 in FIG. 1). It should be clearly understood that the scope of this invention is not limited to use with, or use with measurements made by, wireline instruments. It is within the scope of the present invention to move the instruments along the wellbore, or to use measurements made by instrumented moved along the wellbore, using any conveyance technique known in the art, including but not limited to drill pipe (for so-called "logging while drilling" or "logging while tripping" operations), coiled tubing, production tubing, "slickline", wire rope, as non-limiting examples.

In example methods according to the invention, estimates of Rh and Rv made using the induction instrument shown in FIG. 1 may be improved using formation dip estimated using the wellbore imaging instrument. For example, structural dip may be estimated first by processing the measurements made using the induction instrument shown in FIG. 1. Processing may be performed, for example, using inversion techniques such as described in the Omeragic et al. patent application publication referred to above.

In one example, using measurements made by the imaging instrument shown in and explained with reference to FIG. 3, for example, structural dip of the rock formations may also be estimated. The dip obtained using imaging measurements may be used as a constraint to possible dip calculated the induction processing procedure. By constraining the dip using the image measurements, it is expected that determination of Rv in particular will be substantially improved. Other techniques for using both dip from induction processing and dip from imaging measurements will be further explained below.

Consider two values of formation dip $\{d_1, \alpha_1, \theta_1\}$ and $\{d_2, \alpha_2, \theta_2\}$ in which $d_i$ represents the wellbore axial position (depth) at which the dips are determined, $\alpha_i$ represents the apparent dip azimuth (the angle subtended between the direction of the dip plane and a geodetic or magnetic reference such as North) and $\theta_i$ represents the apparent dip magnitude (the angle of the dip plane with respect to horizontal). Assuming that the foregoing two dip values represent two independent measurements of the same geological feature, it may be inferred that $d_1 \approx d_2$ and $\alpha_1 \approx \alpha_2$.

In an example method, $\{d_1, \alpha_1, \theta_1\}$ can be the dip value obtained by processing a wellbore image made using, for example, an imaging instrument such as shown in FIG. 3. Such dip also assumes a measurement diameter D1, which may be the average of (e.g., two orthogonal) wellbore diameter measurements made by calipers on the imaging instrument, plus a constant related to the lateral depth of investigation of the particular image measurements. $\{d_2, \alpha_2, \theta_2\}$ can be the dip obtained from (e.g., inversion) processing the multiaxial induction measurements made at the respective depth $d_2$.

Figure 4:
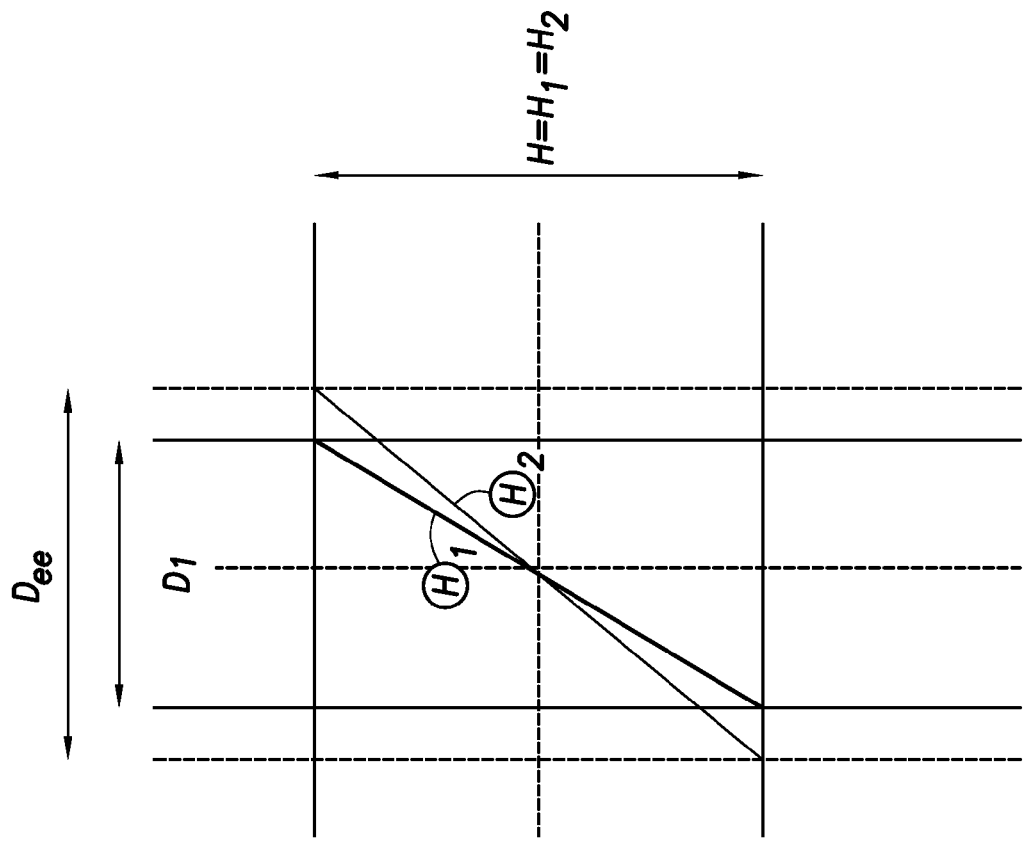
FIG. 4 shows the principle of equivalent measurement diameter for one form of dip evaluation.

An equivalent measurement diameter (De) can be calculated using the following expression:

$$De = D1 * \tan(\theta_1)/\tan(\theta_2)$$

in which D1 represents the wellbore diameter used to compute the wellbore image derived values $\alpha_1$ and $\theta_1$. As a practical matter, De is equal to the diameter corresponding to each of the two dip measurements such that the two dip measurements have the same apparent axial span along the wellbore ("measurement height"). The foregoing may be better understood with reference to FIG. 4, in which each of the measurement heights (H1 and H2) corresponds to the axial span along the wellbore for each of $\theta_1$ and $\theta_2$, respectively. Note that each dip line extends to its apparent measurement diameter.

In some examples, the apparent dip calculated using the multiaxial induction measurements and using imaging measurements may be displayed on a depth based display in ordinary "well log" format to assist in the user's visual interpretation of particular dip features. As is known in the art, a well log display format extends longitudinally to correspond to depth in the wellbore of the particular measurement being made, and the lateral extent of the display is divided into a plurality of "tracks" each having a scale such that lateral position of an output point or curve corresponds to a value of a measured or computed parameter at the corresponding depth (longitudinal position). Such display may include, for example, an image track in which the gray or color scale plot of the image parameter (e.g., resistivity) is displayed with respect to circumferential position on the wellbore wall, where the circumferential position is represented by the position within the track. A dip track may be laterally adjacent to the image track or on another position in the display. The dip track may include the familiar "tadpole" symbols (a line extending from a circle, wherein the circle is centered on a lateral scale position in the track representative of the dip magnitude and the line extends in a direction corresponding to the dip azimuth direction). Such tadpole symbols may represent dips and other features selected from the imaging measurements. The dips from the imaging measurements may be determined either automatically by suitable programming off the recording unit or other computer, or by the user's visual and/or numeric interpretation. The dip track may also include tadpole symbols representative of dip calculated from the multiaxial induction measurements. The display may also include an angular difference track which includes a plot or other symbol representative of an angle between a line normal to individual dip planes and normal to the multiaxial induction calculated dip at the each depth, difference in apparent dip magnitude between induction and image dip, and difference in apparent dip azimuth between induction and image dip.

A caliper track may also be included in the display which shows two or more caliper curves made by caliper sensors in the imaging instrument, as well as an average caliper value. In some examples a measurement diameter may be displayed which is equal to the average caliper value plus a constant representing the measurement depth of penetration used for dip selection by visual interpretation of the wellbore image. An equivalent measurement diameter (calculated as explained above) may also be displayed which is equal to the average caliper value plus an apparent depth of investigation value.

A resistivity track may be included as well that displays apparent values of Rt (formation apparent resistivity), Rv, Rh and Rxo (resistivity in the zone which has all movable connate fluid displaced by the liquid phase of the drilling fluid) calculated from the multiaxial induction measurements, and if the particular well logging instruments enable calculation or measurement of such Rxo resistivity.

The above visual presentation can be used to enable the user to quality check the dip values and to assist in interpretation of any differences between the induction calculated dips and the image determined dips. Example interpretations may include the following, and such interpretations may be machine implemented or performed by the system user:

Relatively large difference in apparent azimuth, but small difference in dip magnitude probably correspond to a dip plane that is nearly orthogonal to the wellbore axis. In such instance, the low apparent dip results in large uncertainty in dip direction.

Existence of several geological features in the same formation interval (e.g., a combination of rock layer boundaries, fractures, cross-bedding, faults, etc.) makes dips calculated from the multiaxial induction measurements less reliable in the corresponding depth interval than those calculated using images.

Existence of geological zones with no parallel structures (Breccia, conglomerates, folds, etc.) makes multiaxial induction calculated dip less reliable in the corresponding depth intervals than image calculated dip.

Correlation between the equivalent measurement diameter and the measured wellbore diameter (e.g., from caliper measurements) with a nominal difference therebetween indicates that the a systematic bias resulting from the assumption of a perfectly circular wellbore but wherein the wellbore is elliptical.

Correlation between the equivalent measurement diameter and formation resistivity (determined, e.g., from the induction measurements) may indicate that the depth of investigation of the measurements used to compute dip from the images varies with depth.

Based on the foregoing interpretations, for example, the user may manually select or a computer program may calculate, on a formation by formation basis or continuously as a function of depth, a relative confidence value for each of the dip determined from the multiaxial induction measurements and for the dip determined from the wellbore images. The foregoing confidence values may be implemented, for example as weight values $w_1$ and $w_2$ for each of the induction dip and the image dip values determined as explained above. Generally, $w_1 \in [0,1]$ and $w_2=(1-w_1)$. A corrected dip value can then be determined as follows: $n = w_1 \cdot n_1 + w_2 \cdot n_2$, where n is the vector normal to the resulting dip, $n_1$ is the vector normal to the dip value from the induction measurements and $n_2$ is the vector normal to the dip from the wellbore image measurements.

The multiaxial induction measurement processing may then be performed once again this time with dip as an input rather than as an output parameter, and with Rv, Rh as output parameters. The result is expected to be a more accurate estimates of Rv and Rh.

Figure 5:
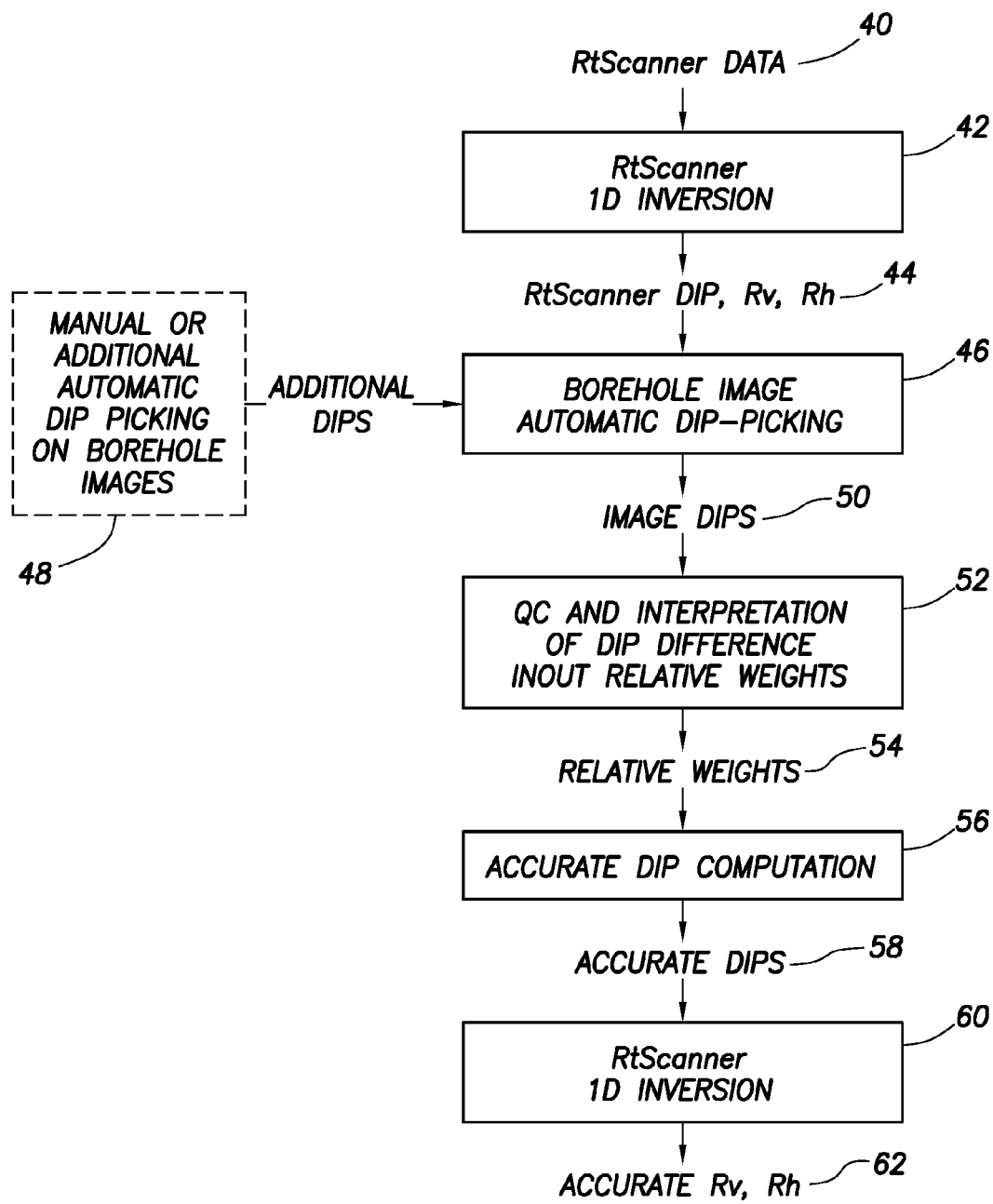
FIG. 5 shows a flow chart of one example process for dip and resistivity evaluation.

Referring to FIG. 5, an example process for calculating dip, Rv and Rh may be implemented as follows. At 40, data are acquired by the multiaxial induction instrument (10 in FIG. 1). At 42, processing (e.g., inversion) of the multiaxial induction measurements results in values of apparent dip (both azimuth and magnitude or inclination), Rh and Rv, at 44. At 48, wellbore images are acquired and processed into apparent dips. Such dip selection may be automated or may be from visual observation by the user of the images or other data. Other dip data if available may be entered into the process if available (e.g., seismic, core samples, etc.). At 46, dip selection from the images is performed and such dips are compared to the induction dips. At 50, image dips compared to the induction dips. At 52, the dips are quality checked, and are interpreted as explained above. Based on the interpretation weights may be assigned, at 54 to each of the image dips and the induction dips, as explained above. The weighted induction dips and image dips are used at 56 to calculate apparent formation dips. The apparent formation dips, at 58, may be input to inversion processing of the induction measurements, at 60. Output of the inversion at 62 can provide more accurate values of Rh and Rv.

Methods according to the invention may provide more accurate values of formation dip and horizontal and vertical resistivity than may be obtained by using images and multiaxial induction measurements individually.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A method for determining a dip of geologic formations penetrated by a wellbore using multiaxial induction measurements and imaging measurements, comprising:

estimating a first dip from first multiaxial induction measurements the multiaxial induction measurements obtained by moving a multiaxial induction well logging instrument through the wellbore and making a record thereof with respect to depth, the estimating including generating values of vertical and horizontal resistivity;

estimating a second dip from imaging measurements the imaging measurements made by moving an imaging well logging instrument through the wellbore and making a record thereof with respect to depth;

determining a combined estimate of the dip by combining the first and second dips and a relative confidence value for each of the dip determined from the multiaxial induction measurements and for the dip determined from the wellbore images;

implementing the relative confidence value as weight values $w_1$ and $w_2$ for each of the induction-determined dip and the image-determined dip values;

calculating a corrected dip value as follows: $n=w_1 \cdot n_1 + w_2 \cdot n_2$, where n is the vector normal to the resulting dip, $n_1$ is the vector normal to the dip value from the induction measurements and $n_2$ is the vector normal to the dip from the wellbore image measurements; and repeating the multiaxial induction measurement estimating using the corrected dip as an input rather than as an output parameter, and with vertical resistivity and horizontal resistivity as output parameters.

2. The method of claim 1 wherein the multiaxial induction measurements include orthogonal triaxial induction measurements.

3. The method of claim 1 wherein the imaging measurements comprise resistivity measurements.

4. The method of claim 1 further comprising estimating a vertical resistivity and a horizontal resistivity of the geologic formations from the multiaxial induction measurements.

5. The method of claim 1 wherein the combining the first and second estimated dips includes generating a weight value for each of the estimated first and second dips, and summing the weighted first dip and the weighted second dip.

6. The method of claim 1 further comprising determining a vertical resistivity and a horizontal resistivity of the geologic formations using the first and second estimated dips.

7. The method of claim 1 wherein the estimating the first dip comprises performing an inversion.

8. The method of claim 1 further comprising estimating an effective borehole diameter.

9. The method of claim 1 further comprising displaying at least one of the first estimated dip, the second estimated dip, and the corrected dip.

\* \* \* \* \*